(12) United States Patent
Zhang et al.

(10) Patent No.: US 9,737,164 B2
(45) Date of Patent: Aug. 22, 2017

(54) TEMPERATURE PROMPTING METHOD AND DEVICE

(71) Applicant: Xiaomi Inc., Beijing (CN)

(72) Inventors: Pengfei Zhang, Beijing (CN); Yongfeng Xia, Beijing (CN); Heng Qu, Beijing (CN); Yidong Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 105 days.

(21) Appl. No.: 14/860,716

(22) Filed: Sep. 22, 2015

(65) Prior Publication Data

US 2016/0055735 A1 Feb. 25, 2016

Related U.S. Application Data

(63) Continuation of application No. PCT/CN2015/071873, filed on Jan. 30, 2015.

(30) Foreign Application Priority Data

Aug. 25, 2014 (CN) .......................... 2014 1 0422053

(51) Int. Cl.
*G08B 17/00* (2006.01)
*A47J 27/21* (2006.01)
*G08B 21/18* (2006.01)

(52) U.S. Cl.
CPC ...... *A47J 27/21008* (2013.01); *G08B 21/182* (2013.01)

(58) Field of Classification Search
CPC ........ G08B 17/06; G08B 29/26; G08B 21/18; G08B 21/182; G01K 3/04; G01K 1/024;
(Continued)

(56) References Cited

U.S. PATENT DOCUMENTS 6,121,596 A * 9/2000 Taino ................... H05B 6/6411
219/494
2006/0081607 A1* 4/2006 Niiyama ................ H05B 6/062
219/497
(Continued)

FOREIGN PATENT DOCUMENTS

CN 102546906 A 7/2012
CN 203133627 U 8/2013
(Continued)

OTHER PUBLICATIONS

"International Search Report for PCT/CN2015/071873".

*Primary Examiner* — Anh V La
(74) *Attorney, Agent, or Firm* — Jun He Law Offices P.C.; James J. Zhu

(57) ABSTRACT

The present disclosure relates to a temperature prompting method and device. The method includes: acquiring a current temperature in a target container; acquiring a distance of the target container to a target terminal, which is linked to the target container; determining, according to the current temperature, a first time duration to be elapsed when a temperature in the target container changes to a predetermined target temperature; determining, according to the distance of the target container to the target terminal, a second time duration to be elapsed when the target terminal moves to a location where the target container stands; and triggering a prompt signal if the first time duration is less than or equal to the second time duration. According to the present disclosure, temperature control flexibility may be improved.

8 Claims, 7 Drawing Sheets

(58) Field of Classification Search
CPC .............. G01K 13/002; G01K 2207/00; G01K 19/0717; G01J 5/0265; A47J 27/21008; A47J 27/21091; A47J 27/212; A47J 27/21083; A47J 27/21; A47J 31/56; A47J 31/441; F24H 9/1818; H05B 2213/07; H05B 6/062
USPC ............... 340/588, 584, 585, 589, 438, 439; 219/494, 481, 497, 506, 518; 392/441, 392/444
See application file for complete search history.

(56) References Cited

U.S. PATENT DOCUMENTS

| | | | | |
|---|---|---|---|---|
| 2007/0008159 A1* | 1/2007 | Meyer | ................ | F24D 19/1051 340/588 |
| 2014/0306833 A1* | 10/2014 | Ricci | ....................... | B60Q 1/00 340/901 |

FOREIGN PATENT DOCUMENTS

| CN | 103676799 A | 3/2014 |
|---|---|---|
| CN | 104257267 A | 1/2015 |

\* cited by examiner

TEMPERATURE PROMPTING METHOD AND DEVICE

CROSS REFERENCE TO RELATED APPLICATIONS

This application is a Continuation of International Application No. PCT/CN2015/071873 with an international filing date of Jan. 30, 2015, which is based upon and claims priority to Chinese Patent Application No. 201410422053.2, filed on Aug. 25, 2014, the entire contents of which are incorporated herein by reference.

TECHNICAL FIELD

The present disclosure relates to the field of computer technologies, and more particularly, relates to a temperature prompting method and a temperature prompting device.

BACKGROUND

In daily life, hot water is desired under certain circumstances, for example, when used for consumption, washing faces, and the likes, therefore, people often need to heat up the water by boiling. Generally, people boil the water by using a kettle, which typically provides a function of generating a prompt when the water is boiling.

Under general circumstances, a process in which users boil water using the kettle is as follows: cold water is added to the kettle, a cover of the kettle is put onto the kettle, a switch is turned on, the kettle starts to heat up the water, and the kettle triggers a prompt signal (for example, generating a sound or the like) until the water in the kettle is boiling, thus to notify the users that the water is boiling.

SUMMARY

The present disclosure provides a temperature prompting method and a temperature prompting device. The following technical solutions are employed.

According to a first aspect of embodiments of the present disclosure, a temperature prompting method is provided. The method includes: acquiring a current temperature in a target container, acquiring a distance of the target container to a target terminal, which is linked to the target container; determining, according to the current temperature, a first time duration to be elapsed when a temperature in the target container changes to a predetermined target temperature; determining, according to the distance of the target container to the target terminal, a second time duration to be elapsed when the target terminal moves to a location where the target container stands; and triggering a prompt signal if the first time duration is less than or equal to the second time duration.

According to a second aspect of embodiments of the present disclosure, a temperature prompting device is provided. The device includes: one or more processors; a memory; and one or more modules stored in the memory and being configured to be executed by the one or more processors, the one or more modules having the following functions: acquiring a current temperature in a target container; acquiring a distance of the target container to a target terminal, which is linked to the target container; determining, according to the current temperature, a first time duration to be elapsed when a temperature in the target container changes to a predetermined target temperature; determining, according to the distance of the target container to the target terminal, a second time duration to be elapsed when the target terminal moves to a location where the target container stands; and triggering a prompt signal if the first time duration is less than or equal to the second time duration.

According to a third aspect of embodiments of the present disclosure, a non-transitory computer-readable storage medium having stored therein instructions that, when executed by one or more processors of a device, cause the device to perform: acquiring a current temperature in a target container; acquiring a distance of the target container to a target terminal, which is linked to the target container; determining, according to the current temperature, a first time duration to be elapsed when a temperature in the target container changes to a predetermined target temperature; determining, according to the distance of the target container to the target terminal, a second time duration to be elapsed when the target terminal moves to a location where the target container stands; and triggering a prompt signal if the first time duration is less than or equal to the second time duration.

It shall be appreciated that both the above general description and the detailed description hereinafter are only illustrative and interpretative, but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure. Among the drawings.

The above drawings are used for illustrating the specific embodiments of the present disclosure, and more details will be given hereinafter. These drawings and textual descriptions are not intended to limit the scope defined in the present disclosure in any way, but intended to describe the inventive concept of the present disclosure through specific embodiments for a person skilled in the art.

DETAILED DESCRIPTION

Reference will now be made in detail to exemplary embodiments, examples of which are illustrated in the accompanying drawings. The following description refers to accompanying drawings in which the same numbers in different drawings represent the same or similar elements unless otherwise represented. The implementations set forth in the following exemplary embodiments do not represent all implementations consistent with the present disclosure. Instead, they are merely examples of apparatuses and methods consistent with aspects related to the present disclosure as recited in the appended claims.

First Embodiment

Figure 1:
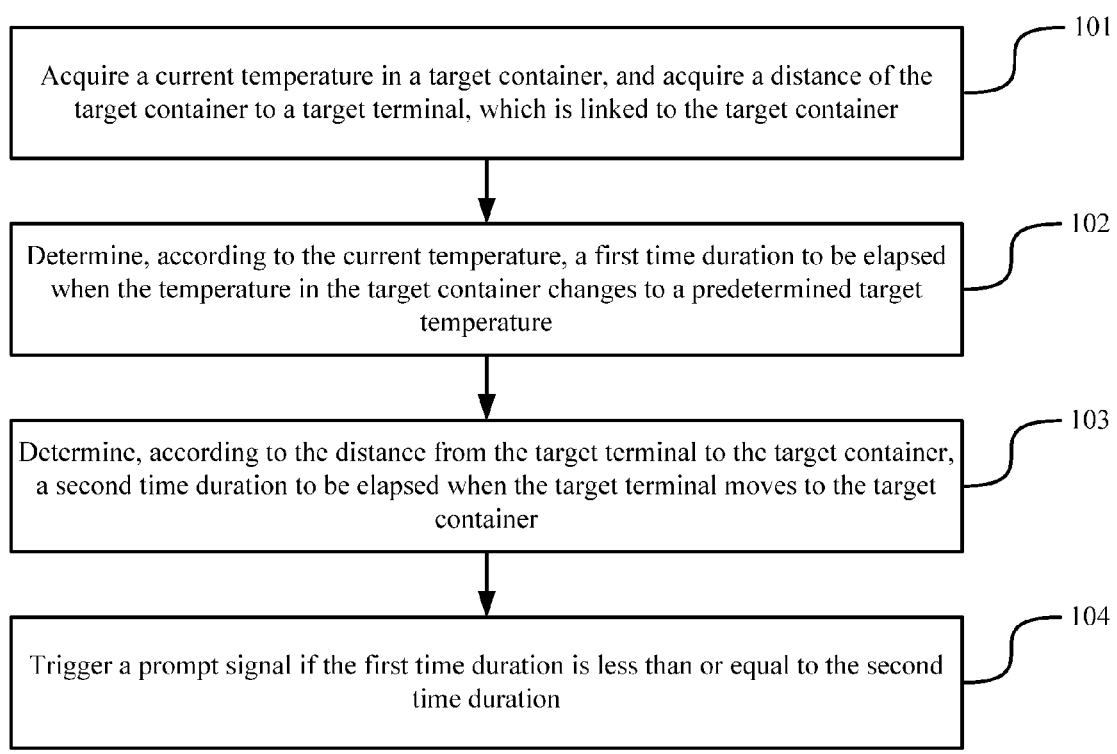
FIG. 1 is a flowchart illustrating a temperature prompting method according to an exemplary embodiment of the present disclosure.

According to a first aspect of the embodiments of the present disclosure, a temperature promoting method is provided. As illustrated in FIG. 1, a execution body of the temperature control method (in other words, a temperature promoting device) may be a server, a router, a terminal or a smart container; wherein the smart container may be a smart kettle, a smart cup or the like, the terminal may be a mobile terminal such as a mobile phone, a smart band or the like, and the server may be a background server of an application for temperature control.

Figure 2:
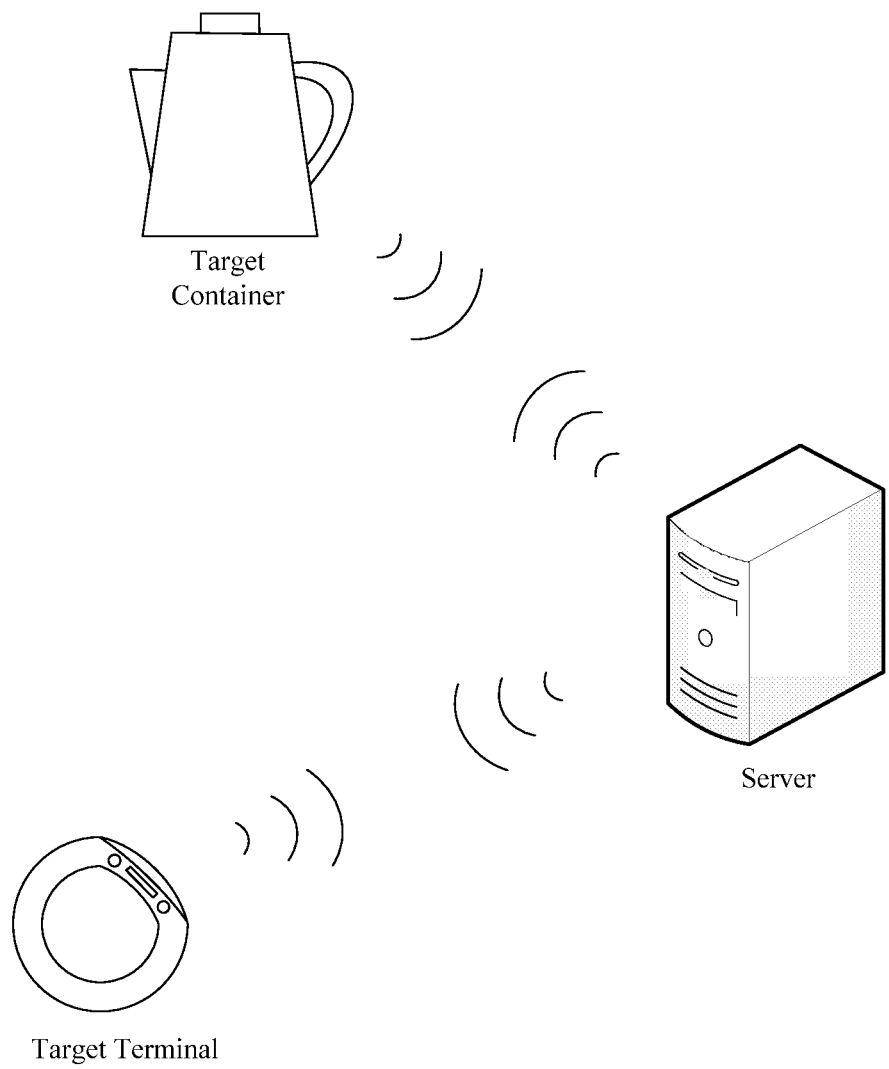
FIG. 2 is a schematic diagram illustrating a system architecture according to an exemplary embodiment of the present disclosure.

In this embodiment, the technical solution is described in detail with a scenario where a user boils water as an example. The execution body is, for example, a server, and the substance to be heated in the container is, for example, water. Cases for other scenarios, devices, and substances to be heated are similar, which are not described herein any further. A system architecture diagram according to the embodiments of the present disclosure may be illustrated in FIG. 2, including: a target container, a target terminal, and a server. As illustrated in FIG. 1, the process of the method may include the following steps.

In step 101, a current temperature in a target container is acquired, and a distance of the target container to a target terminal, which is linked to the target container is acquired.

In this embodiment, a binding relation between a target container and a target terminal may be established in a server, and such binding relation may be established in a plurality of manners. When there is a binding relation between a container and a terminal, it also means that the container is linked to the terminal, or alternatively, the terminal is linked to the container. An application for temperature control may be respectively installed in the target container and the target terminal. The user may start the application over a terminal or the like to log in to the server; and the server may bind a smart container to a target terminal that has the same account with the smart container, and record the binding relation between them. For example, after the user starts an application over a mobile phone and then logs in to the server via account A, the server detects that a smart container also logs in to the server via account A, then the server binds the mobile phone to the smart container.

Alternatively, the user may send a request to the server via an application in the terminal, requesting the server to bind a target container to a target terminal. In this case, the server may correspondingly store the device identifier of the smart container and the device identifier of the target terminal to record a binding relation between them. For example, after the user starts an application over a mobile phone, a binding relation is established between a smart kettle and a smart band, and this binding relation is notified to the server.

When the user desires the water reaching a certain temperature (for example, 70° C.), the user may set this temperature on the smart container (i.e., the target container) as the target temperature for heating, and turn on the heating switch of the target container; and then the target container starts heating the water. The target container may be equipped with a temperature sensor, and the temperature sensor may acquire the temperature of the water in the target container. When the user sets a target temperature and turns on the switch of the target container, the target container may detect the temperature of the water in the target container via the temperature sensor, and periodically send the detected temperature to the server. As such, the server is capable of acquiring the temperature in the target container.

A positioning apparatus may be respectively installed on the target container and the target terminal, and the positioning apparatus may acquire location information of the target container or the target terminal. Upon receiving the temperature of the water sent by the target container, the server may firstly determine a terminal (i.e., the target terminal) which is linked to the target container. For example, the server may acquire an account via which the target container logs in to the server, and thus query the terminal that logs in to the server via the account. When a smart band is found to log in to the server via the account, the smart band is the queried target terminal. Subsequently, the server may separately send a location query request to the target container and the target terminal. Upon receiving the location query request, the target container and the target terminal may periodically acquire their location information respectively via the positioning apparatus, and respectively send the acquired location information to the server. Herein, the period of acquiring and sending the location information may be the same as that of sending the temperature value. The server may calculate a distance from the target container to the target terminal according to the received location information of the target container and the target terminal.

In step 102, a first time duration to be elapsed when the temperature in the target container changes to a predetermined target temperature is determined according to the current temperature.

In this embodiment, the server may predetermine a heating speed. Upon receiving a current temperature sent by the target container, the server may acquire a target temperature predetermined by the user, i.e., a target temperature uploaded by the target container, and thus the server may calculate a difference between the target temperature and the current temperature, and divide the difference by the predetermined heating speed. The obtained quotient is a time duration (i.e., the first time duration) to be elapsed when the temperature of the water in the target container changes to the target temperature.

It should be noted that step 102 and step 103 are not necessarily subjected to a time sequential relation.

In step 103, a second time duration to be elapsed when the target terminal moves to a location where the target container stands is determined according to the distance of the target container to the target terminal.

In this embodiment, the server may predetermine a movement speed of the target terminal, and the movement speed may be obtained based on statistics of general movement speeds of ordinary persons. Upon receiving the location information of the target container and the target terminal, the server may calculate the distance of the target container to the target terminal, and then divide the distance by the predetermined movement speed. The obtained quotient is a time duration (i.e., the second time duration) to be elapsed when the target terminal moves to a location where the target container stands. This time duration may be considered as a time duration to be elapsed when the user wearing the smart band (i.e., the target terminal) moves to the smart kettle (i.e., the target container).

In step 104, a prompt signal is triggered if the first time duration is less than or equal to the second time duration.

In this embodiment, upon determining the first time duration and the second time duration, the server may compare the first time duration with the second time duration. If the first time duration is less than or equal to the second time duration, it indicates that if the user now starts to move towards the target container and when the user reaches the target container, the temperature in the target container has reached the predetermined target temperature. Under such circumstance, the server may trigger the target container and/or the target terminal to emit a prompt signal to prompt the user. If the first time duration is greater than the second time duration, it indicates that if the user now starts to move towards the target container and when the user reaches the target container, the temperature in the target container has not reached the predetermined target temperature. Under such circumstance, the server may perform no operation, i.e., may not trigger a prompt signal. Under the above circumstance where a prompt signal is sent, the user may move towards the target container upon receipt of the prompt signal. During the movement of the user, the target container remains heating the water. When it is detected via the temperature sensor that the temperature of the water in the target container has reached the target temperature, the target container stops heating the water. Based on the above calculation process of the server, it can be known that when the user approaches the target container, the target container may have stopped heating the water or just stop heating the water.

In the embodiments of the present disclosure, a current temperature in a target container is acquired, and a distance of the target container to a target terminal, which is linked to the target container is acquired; a first time duration to be elapsed when the temperature in the target container changes to a predetermined target temperature is determined according to the current temperature; a second time duration to be elapsed when the target terminal moves to a location where the target container stands is determined according to the distance of the target container to the target terminal; and a prompt signal is triggered if the first time duration is less than or equal to the second time duration. In this way, any predetermined target temperature may be prompted, such that the temperature in the container may be controlled at any target temperature, thereby improving flexibility in temperature control.

Second Embodiment

According to a second aspect of the embodiments of the present disclosure, a temperature promoting method is provided. The execution body of the temperature control method may be a server, a router, a terminal, or a smart container. The smart container may be a smart kettle, a smart cup or the like. The terminal may be a mobile terminal such as a mobile phone, a smart band or the like. The server may be a background server of an application for temperature control.

In this embodiment, the technical solution is described in detail with a scenario where a user boils water as an example. The execution body is, for example, a server. The substance to be heated in the container is, for example, water. Cases for other scenarios, devices, and substances to be heated are similar, which are not described herein any further. A system architecture according to an embodiment of the present disclosure may be illustrated in FIG. 2, including: a target container, a target terminal, and a server.

Figure 3:
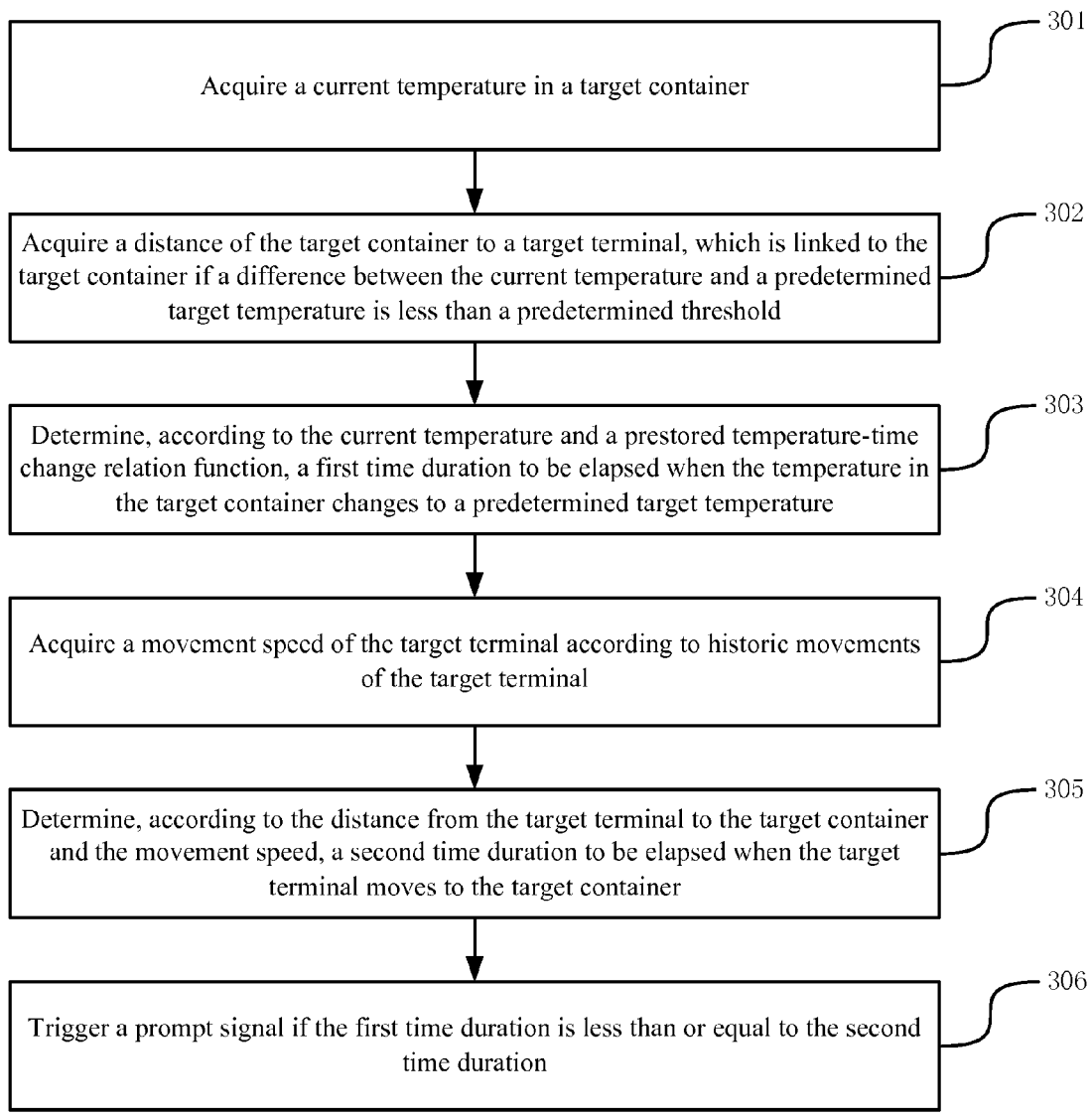
FIG. 3 is a flowchart illustrating a temperature prompting method according to an exemplary embodiment of the present disclosure.

The process is described in detail with reference to an exemplary embodiment. As illustrated in FIG. 3, the process of the method may include the following steps.

In step 301, a current temperature in a target container is acquired.

The target container is equipped with a temperature measuring device. However, the specific position for installing the temperature measuring device is not limited. For example, the temperature measuring device may be installed on an inner wall, a bottom or the like of the target container.

For example, when the user desires the water reaching a certain temperature (for example, 70° C.), the user may set this temperature on the smart container (i.e., the target container) as the target temperature for heating via a corresponding application on a mobile phone, and turn on the heating switch of the target container; and then the target container starts heating the water. The target container may be equipped with a temperature sensor, and the temperature sensor may acquire the temperature of the water in the target container. When the user sets a target temperature and turns on the switch of the target container, the target container may detect the temperature of the water in the target container via the temperature sensor, and periodically send the detected temperature to the server. As such, the server is capable of acquiring the temperature in the target container.

In step 302, a distance of the target container to a target terminal, which is linked to the target container is acquired if a difference between the current temperature and a predetermined target temperature is less than a predetermined threshold.

In this embodiment, the target container may acquire a temperature of the water in the target container via the temperature sensor, and periodically send the acquired temperature value to the server. Upon receiving the temperature value sent by the target container, the server may calculate a difference between the temperature and the target temperature, and compare the difference with a predetermined threshold (for example, 20° C.). If the difference is less than the predetermined threshold, the server may request location information of the target container and location information of the target terminal, and calculate a distance therebetween. Otherwise, the server may perform no operation.

In step 303, a first time duration to be elapsed when the temperature in the target container changes to a predetermined target temperature is determined according to the current temperature and a prestored function of temperature with respect to time.

The function of temperature with respect to time may be a function reflecting changes of the temperature with the heating time.

Figure 4:
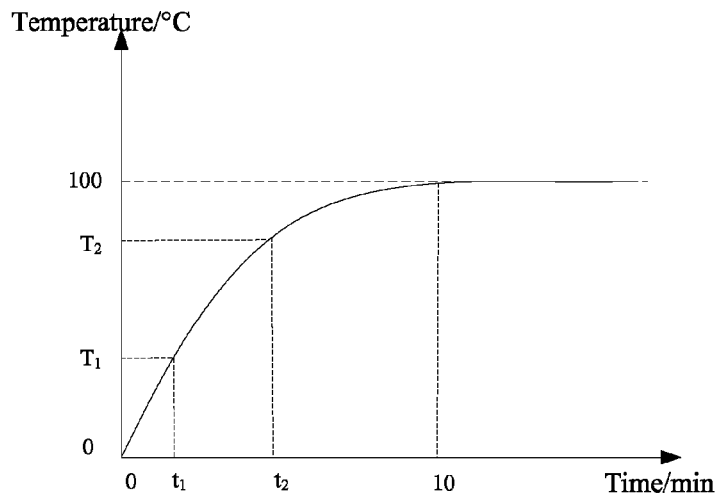
FIG. 4 is a schematic diagram illustrating a function curve according to an exemplary embodiment of the present disclosure.

In this embodiment, the server may prestore the function of temperature with respect to time of the water, and the function of temperature with respect to time may be obtained via analysis and calculation based on a large amount of experimental data. The corresponding function curve may be as illustrated in FIG. 4. When the server acquires the current temperature in the target container, the current temperature may be introduced into the function of temperature with respect to time, and thus a first time ($t_1$ in FIG. 4) corresponding to the current temperature (i.e., $T_1$ in FIG. 4) in the target container is determined. The server may further introduce the target temperature into a temperature change relation function, and thus a second time (i.e., $t_2$ in FIG. 4) corresponding to the target temperature (i.e., $T_2$ in FIG. 4) is determined. Hence, a difference between $t_1$ and $t_2$ may be calculated. The difference is the first time duration to be elapsed when the current temperature in the target container changes to the predetermined target temperature. Optionally, the function of temperature with respect to time may further include a variant of the ambient temperature, and the target container may further acquire an ambient temperature and report the acquired ambient temperature to the server. The server may obtain the first time duration in a calculation manner similar to the above described one based on the ambient temperature, the target temperature, and the current temperature in the target container. In addition, optionally, in the function of temperature with respect to time, variants of the heating power and the volume may be further set. The target container may further report its heating power and its water volume to the server. The server may obtain the first time duration in a calculation method similar to the above described one based on the ambient temperature, the target temperature, the current temperature, the heating power, and the volume.

In step 304, a movement speed of the target terminal is acquired according to historic movements of the target terminal.

In this embodiment, the server may detect, via the target terminal, motion states of a user holding the target terminal and movement speeds in different motion states. For example, the server may detect an average movement speed of the user in a walking state. Under a general circumstance, the user moves to a location where the target container stands by walking, and therefore, the server may acquire an average movement speed of the user in the walking state according to historic movements from the target terminal, and record the average movement speed for subsequent processing. For example, the server sends a speed acquisition request to the smart band, and in response to the request, the smart band sends the average movement speed of the user in the walking state according to historic movements to the server.

In step 305, a second time duration to be elapsed when the target terminal moves to a location where the target container stands is determined according to the distance of the target container to the target terminal and the movement speed.

In this embodiment, the server may divide the value of the distance from the target container to the target terminal by the acquired movement speed, and the obtained quotient is a time duration to be elapsed when the target terminal moves to a location where the target container stands. This time duration may be considered as a time duration to be elapsed when the user wearing the smart band (i.e., the target terminal) moves to the smart kettle (i.e., the target container).

In step 306, a prompt signal is triggered if the first time duration is less than or equal to the second time duration.

A variety of manners are available for triggering a prompt signal. Different manners may be separately used or collaboratively used. Two applicable manners are listed as below.

Manner 1: If the first time duration is less than or equal to the second time duration, a prompt notification is sent to the target terminal, such that the target terminal emits a prompt signal.

In this embodiment, if the first time duration is less than or equal to the second time duration, the server may send a prompt notification to the target terminal. Upon receiving the prompt notification sent by the server, the target terminal may emit a prompt signal to prompt the user. The target terminal may emit the prompt signal in a plurality of forms, for example, a ring tone, a vibration, a flash, or the like. The target terminal may set one of the above forms as the default form of the prompt signal. In addition, the user may set the form of the prompt signal according to such factors as user's preferences, favorites, needs, and the like. For example, if the first time duration is less than or equal to the second time duration, the server may send a prompt notification to the smart band. Upon receiving the prompt notification sent by the server, the smart band may prompt, in the form of vibration, the user that the water is boiling.

Manner 2: If the first time duration is less than or equal to the second time duration, a prompt notification is sent to the target container, such that the target container emits a prompt signal.

In this embodiment, if the first time duration is less than or equal to the second time duration, the server may send a prompt notification to the target container. Upon receiving the prompt notification sent by the server, the target container may emit a prompt signal to prompt the user. The target container may emit the prompt signal in a plurality of forms, for example, a ring tone, a vibration, a flash, or the like. The target container may set one of the above forms as the default form of the prompt signal. In addition, the user may set the form of the prompt signal according to such factors as user's preferences, favorites, needs, and the like. For example, if the first time duration is less than or equal to the second time duration, the server may send a prompt notification to the smart kettle. Upon receiving the prompt notification sent by the server, the smart kettle may prompt, in the form of ring tone, the user that the water is boiling.

In the embodiments of the present disclosure, a current temperature in a target container is acquired, and a distance of the target container to a target terminal, which is linked to the target container is acquired; a first time duration to be elapsed when the temperature in the target container changes to a predetermined target temperature is determined according to the current temperature; a second time duration to be elapsed when the target terminal moves to a location where the target container stands is determined according to the distance of the target container to the target terminal; and a prompt signal is triggered if the first time duration is less than or equal to the second time duration. In this way, any predetermined target temperature may be prompted, such that the temperature in the container may be controlled at any target temperature, thereby improving flexibility in temperature control.

Third Embodiment

Figure 5:
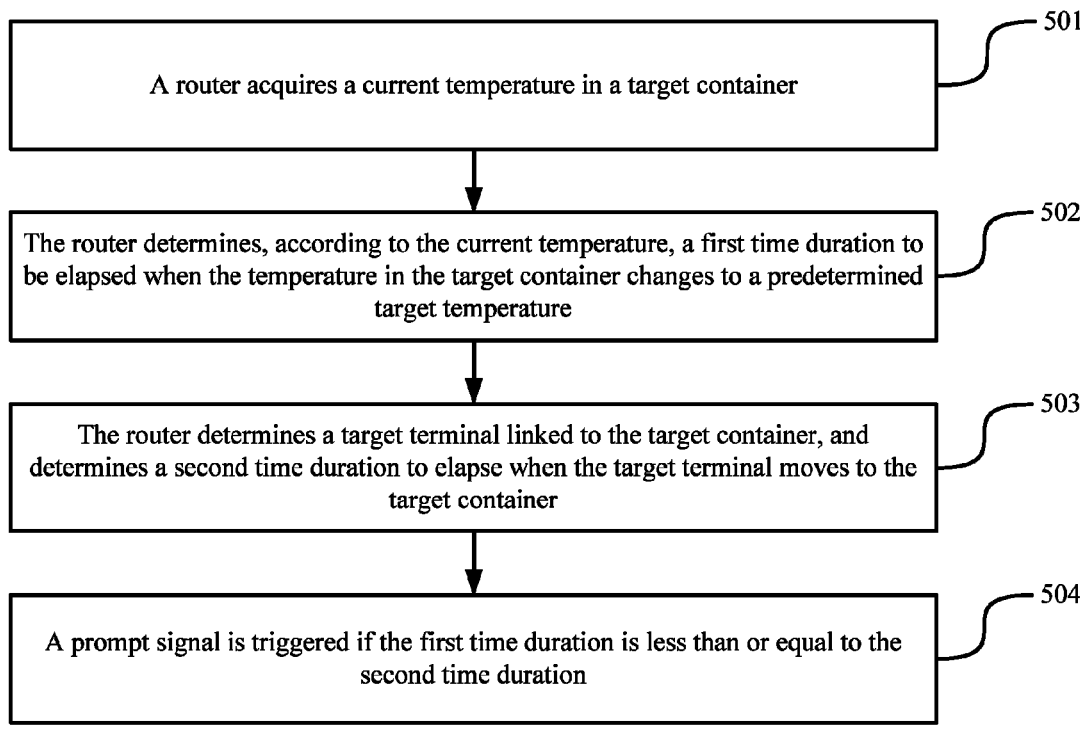
FIG. 5 is a flowchart illustrating a temperature prompting method according to an exemplary embodiment of the present disclosure.

According to a third aspect of the embodiments of the present disclosure, a temperature prompting method is provided. The technical solution is hereinafter described in detail using the scenario where the execution body is a router as an example with reference to the scenario where a user boils water. As illustrated in FIG. 5, the process may include the following steps.

In step 501, a router acquires a current temperature in a target container.

In this embodiment, the target container is equipped with a temperature measuring device. However, the specific position for installing the temperature measuring device is not limited. For example, the temperature measuring device may be installed on an inner wall, a bottom or the like of the target container.

For example, when the user desires the water reaching a certain temperature (for example, 70° C.), the user may set this temperature on the smart container (i.e., the target container) as the target temperature for heating via a corresponding application over a mobile phone, and turn on the heating switch of the target container; and then the target container starts heating the water. The target container may be equipped with a temperature sensor, and the temperature sensor may acquire the temperature of the water in the target container. When the user sets a target temperature and turns on the switch of the target container, the target container may detect the temperature of the water in the target container via the temperature sensor, and periodically send the detected temperature to the router. As such, the router is capable of acquiring the temperature in the target container.

In step 502, the router determines, according to the current temperature, a first time duration to be elapsed when the temperature in the target container changes to a predetermined target temperature.

The manner in which the router determines the first time duration is similar to the manner in which the first time duration is determined in step 102. The details may be referred to the related content in the above embodiments, which are not described herein any further.

In step 503, the router determines a target terminal linked to the target container, and determines a second time duration to be elapsed when the target terminal moves to a location where the target container stands.

In this embodiment, a binding relation between a target container and a target terminal may be established in a router, and such binding relation may be established in a plurality of manners. An application for temperature control may be respectively installed in the target container and the target terminal. The user may start the application over a terminal or the like to log in to the router; and the router may bind a smart container to a target terminal that has the same account to the smart container, and record the binding relation between them. For example, after the user starts an application over a mobile phone and then logs in to the router via account A, the router detects that a smart container also logs in to the router via account A, and then the router binds the mobile phone to the smart container.

Alternatively, the user may send a request to the router via an application in the terminal, requesting the router to bind a target container to a target terminal. In this case, the router may correspondingly store the device identifier of the smart container and the device identifier of the target terminal to record a binding relation between them. For example, after the user starts an application over a mobile phone, a binding relation is established between a smart kettle and a smart band, and this binding relation is notified to the router.

In step 504, a prompt signal is triggered if the first time duration is less than or equal to the second time duration.

A variety of manners are available for triggering a prompt signal. Different manners may be separately used or collaboratively used. Two available manners are listed as below.

Manner 1: If the first time duration is less than or equal to the second time duration, the router sends a prompt notification to the target terminal, such that the target terminal emits a prompt signal.

Manner 2: If the first time duration is less than or equal to the second time duration, the router sends a prompt notification to the target container, such that the target container emits a prompt signal.

The above two manners are similar to the manner described in step 306, related content in the above embodiments may be referenced, which is not described herein any further.

In step 502, the first time duration may be determined in the following manner: the first time duration to be elapsed when the temperature in the target container changes to a predetermined target temperature is determined according to the current temperature and a prestored function of temperature with respect to time.

The manner in which the router determines the first time duration is similar to the manner in which the first time duration is determined in step 303. The details may be referred to the related content in the above embodiments, which are not described herein any further.

In step 503, the second time duration may be determined in the following manner: if a difference between the current temperature and the predetermined target temperature is less than a predetermined threshold, acquiring a distance of the target container to a target terminal, which is linked to the target container, acquiring a movement speed of the target terminal according to historic movements, and determining, according to the distance of the target container to the target terminal and the movement speed, a second time duration to be elapsed when the target terminal moves to a location where the target container stands.

The manner in which the router determines the second time duration is similar to the manner in which the second time duration is determined in step 305. The details may be referred to the related content in the above embodiments, which are not described herein any further.

In the embodiments of the present disclosure, a current temperature in a target container is acquired, and a distance of the target container to a target terminal, which is linked to the target container is acquired; a first time duration to be elapsed when the temperature in the target container changes to a predetermined target temperature is determined according to the current temperature; a second time duration to be elapsed when the target terminal moves to a location where the target container stands is determined according to the distance of the target container to the target terminal; and a prompt signal is triggered if the first time duration is less than or equal to the second time duration. In this way, any predetermined target temperature may be prompted, such that the temperature in the container may be controlled at any target temperature, thereby improving flexibility in temperature control.

Fourth Embodiment

Figure 6:
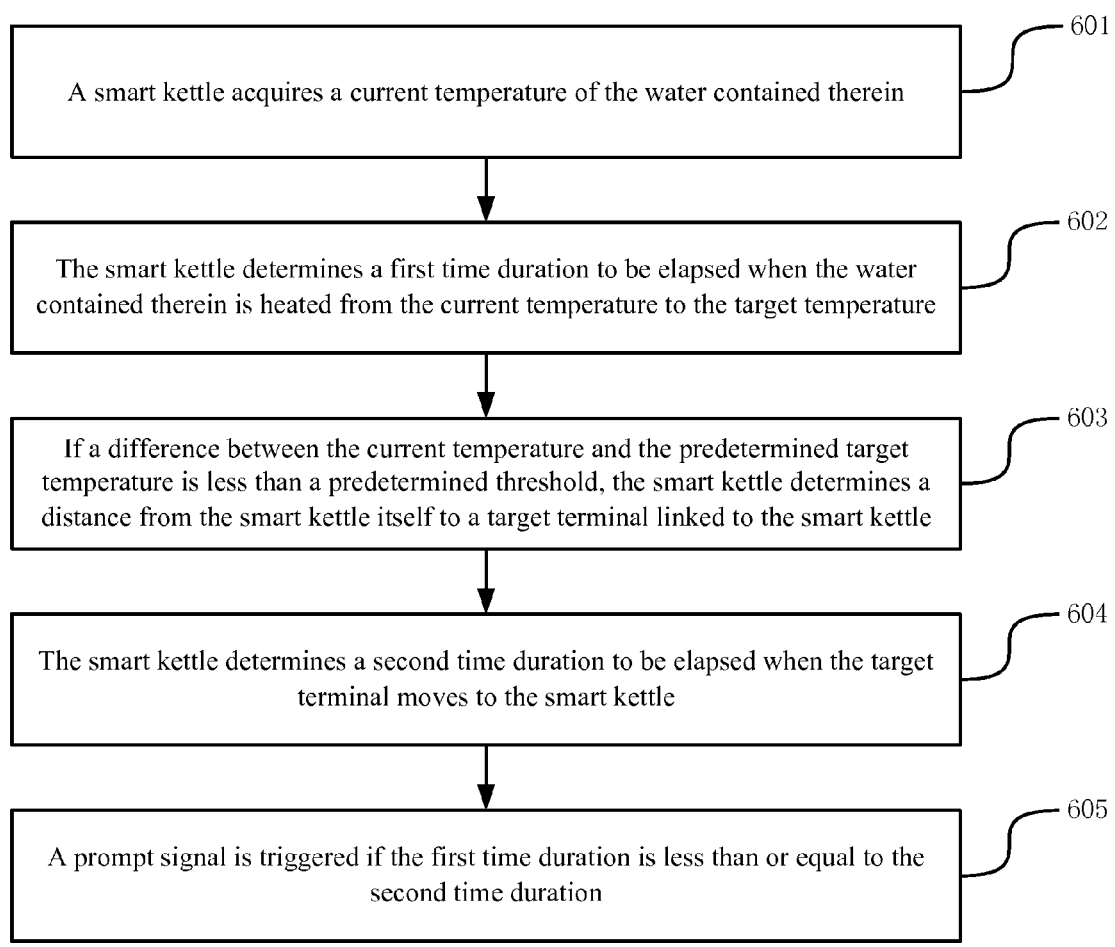
FIG. 6 is a flowchart illustrating a temperature prompting method according to an exemplary embodiment of the present disclosure.

According to a fourth aspect of the embodiments of the present disclosure, a temperature prompting method is provided. The technical solution is hereinafter described in detail using the scenario where the execution body is a smart kettle as an example with reference to the scenario where a user boils water. As illustrated in FIG. 6, the process may include the following steps.

In step 601, a smart kettle (i.e., a target container) acquires a current temperature of the water contained therein.

In this embodiment, the smart kettle is equipped with a temperature measuring device. However, the specific position for installing the temperature measuring device is not limited. For example, the temperature measuring device may be installed on an inner wall, a bottom or the like of the smart kettle.

For example, when the user desires the water reaching a certain temperature (for example, 70° C.), the user may set this temperature on the smart kettle via a corresponding application over a mobile phone as a target temperature for heating, and turn on the heating switch of the smart kettle; and then the smart kettle starts heating the water. The smart kettle may be equipped with a temperature sensor, and the temperature sensor may acquire a temperature of the water in the smart kettle. When the user sets the target temperature and turns on the switch of the smart kettle, the smart kettle may detect the temperature of the water in the smart kettle via the temperature sensor.

In step 602, the smart kettle determines a first time duration to be elapsed when the water contained therein is heated from the current temperature to the target temperature.

The manner in which the smart kettle determines the first time duration is similar to the manner in which the first time duration is determined in step 303. The details may be referred to the related content in the above embodiments, which are not described herein any further.

In step 603, if a difference between the current temperature and the predetermined target temperature is less than a predetermined threshold, the smart kettle determines a distance from the smart kettle itself to a target terminal linked to the smart kettle.

In this embodiment, the user may predetermine, in the smart kettle, a smart band (i.e., the target terminal) linked to the smart kettle. The smart kettle may acquire a temperature of the water in the smart kettle via the temperature sensor. Upon acquiring the current temperature, the smart kettle may calculate a difference between the temperature and the predetermined target temperature, and compare the difference with a predetermined threshold (for example, 20° C.). If the difference is less than the predetermined threshold, the smart kettle may request location information of the smart band linked to the smart kettle from a server, acquire location information of the smart kettle itself, and then calculate a distance therebetween; or the smart kettle may acquire a distance between the smart kettle and the smart band bound thereto via a distance detection apparatus. If the difference is greater than the predetermined threshold, the smart kettle performs no operation.

In step 604, the smart kettle determines a second time duration to be elapsed when the target terminal moves to the smart kettle.

The second time duration may be acquired in the following manner: acquiring a movement speed of the target terminal according to historic movements, and determining, according to the distance from the target terminal to the smart kettle and the movement speed, a second time duration to be elapsed when the target terminal moves to the smart kettle.

The manner in which the smart kettle determines the second time duration is similar to the manner in steps 304 and 305. The details may be referred to the related content in the above embodiments, which are not described herein any further.

In step 605, a prompt signal is triggered if the first time duration is less than or equal to the second time duration.

A variety of manners are available for triggering a prompt signal. Different manners may be separately used or collaboratively used. Two available manners are listed as below.

Manner 1: If the first time duration is less than or equal to the second time duration, the smart kettle sends a prompt notification to the smart band bound to the smart kettle, such that the bound smart band emits a prompt signal. For example, if the first time duration is less than or equal to the second time duration, the smart kettle may send a prompt notification to the bound smart band. Upon receiving the prompt notification sent by the smart kettle, the smart band may prompt, in the form of vibration, the user that the water is boiling.

Manner 2: The smart kettle emits a prompt signal if the first time duration is less than or equal to the second time duration. For example, if the first time duration is less than or equal to the second time duration, the smart kettle may prompt the user that the water is boiling in a manner of generating a ring tone.

In the embodiments of the present disclosure, a current temperature in a target container is acquired, and a distance of the target container to a target terminal, which is linked to the target container is acquired; a first time duration to be elapsed when the temperature in the target container changes to a predetermined target temperature is determined according to the current temperature; a second time duration to be elapsed when the target terminal moves to a location where the target container stands is determined according to the distance of the target container to the target terminal; and a prompt signal is triggered if the first time duration is less than or equal to the second time duration. In this way, any predetermined target temperature may be prompted, such that the temperature in the container may be controlled at any target temperature, thereby improving flexibility in temperature control.

Fifth Embodiment

Figure 7:
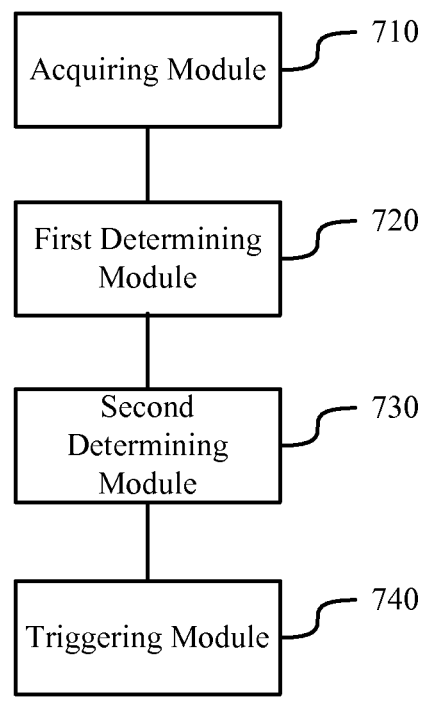
FIG. 7 is a schematic structural diagram illustrating a temperature prompting apparatus according to an exemplary embodiment of the present disclosure.

Based on the same technical concept, according to a fifth aspect of the embodiments of the present disclosure, a temperature prompting apparatus is provided. As illustrated in FIG. 7, the apparatus includes: an acquiring module 710, a first determining module 720, a second determining module 730, and a triggering module 740.

The acquiring module 710 is configured to acquire a current temperature in a target container, and acquire a distance of the target container to a target terminal, which is linked to the target container.

The first determining module 720 is configured to determine, according to the current temperature, a first time duration to be elapsed when the temperature in the target container changes to a predetermined target temperature.

The second determining module 730 is configured to determine, according to the distance of the target container to the target terminal, a second time duration to be elapsed when the target terminal moves to a location where the target container stands.

The triggering module 740 is configured to trigger a prompt signal if the first time duration is less than or equal to the second time duration.

Optionally, the acquiring module 710 is configured to: acquire a current temperature in a target container, and acquire a distance of the target container to a target terminal, which is linked to the target container if a difference between the current temperature and a predetermined target temperature is less than a predetermined threshold.

Optionally, the first determining module 720 is configured to: determine, according to the current temperature and a prestored function of temperature with respect to time, a first time duration to be elapsed when the temperature in the target container changes to a predetermined target temperature.

Optionally, the second determining module 730 is configured to: acquire a movement speed of the target terminal according to historic movements; and determine according to the distance of the target container to the target terminal and the movement speed, a second time duration to be elapsed when the target terminal moves to a location where the target container stands.

Optionally, the triggering module 740 is configured to: if the first time duration is less than or equal to the second time duration, send a prompt notification to the target terminal, such that the target terminal emits a prompt signal; and/or if the first time duration is less than or equal to the second time duration, send a prompt notification to the target container, such that the target container emits a prompt signal.

With respect to the apparatuses in the above embodiment, the specific implementations of operations executed by various modules thereof have been described in detail in the embodiments illustrating the methods, which are not described herein any further.

In the embodiments of the present disclosure, a current temperature in a target container is acquired, and a distance of the target container to a target terminal, which is linked to the target container is acquired; a first time duration to be elapsed when the temperature in the target container changes to a predetermined target temperature is determined according to the current temperature; a second time duration to be elapsed when the target terminal moves to a location where the target container stands is determined according to the distance of the target container to the target terminal; and a prompt signal is triggered if the first time duration is less than or equal to the second time duration. In this way, any predetermined target temperature may be prompted, such that the temperature in the container may be controlled at any target temperature, thereby improving flexibility in temperature control.

It should be noted that, during prompting of the temperatures by the temperature prompting apparatuses according to the above embodiments, the apparatuses are described by only using division of the above functional modules as examples. In practice, the functions may be assigned to different functional modules for implementation as required. To be specific, the internal structure of the apparatus is divided into different functional modules to implement all or part of the above-described functions. In addition, the temperature prompting apparatuses according to the above embodiments are based on the same inventive concept as the temperature prompting methods according to the embodiments of the present disclosure. The specific implementation is elaborated in the method embodiments, which is not described herein any further.

Sixth Embodiment

Figure 8:
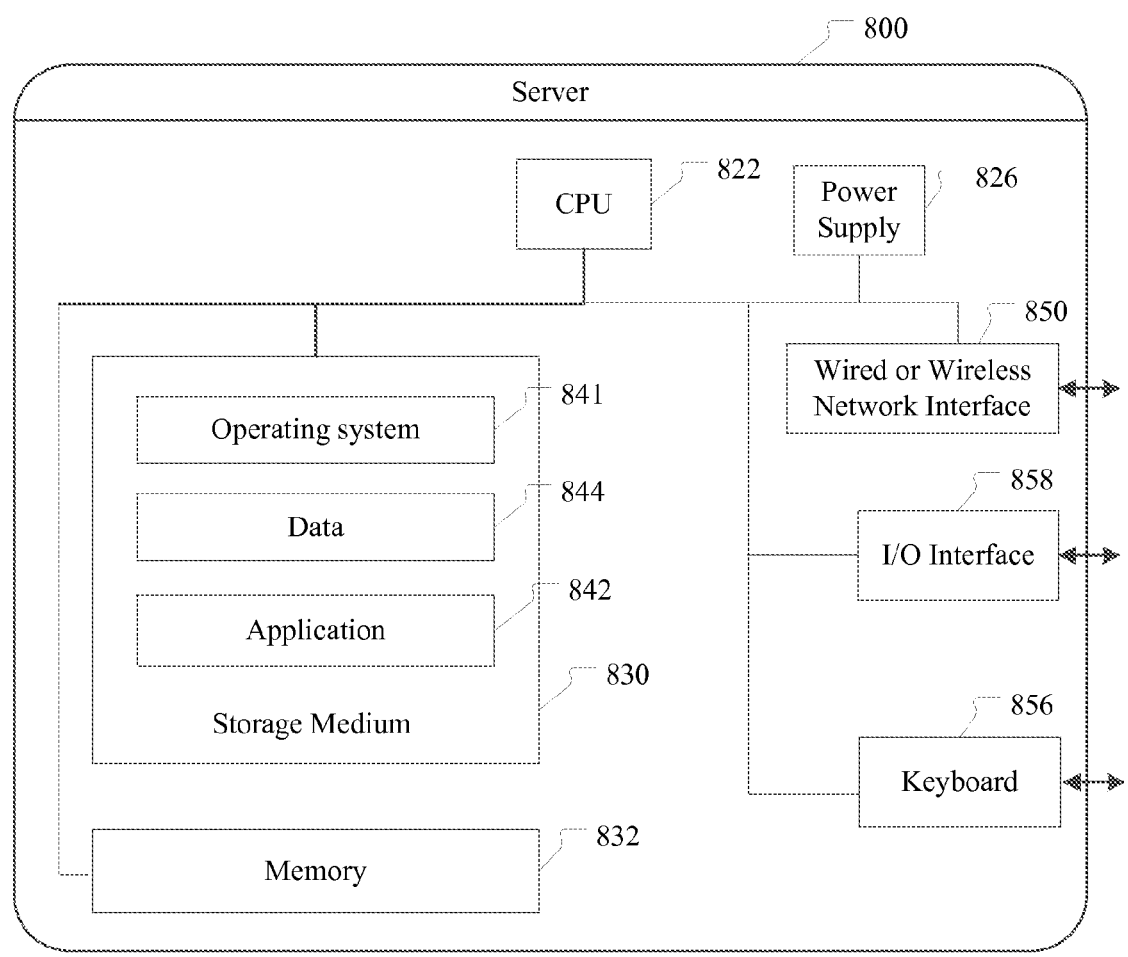
FIG. 8 is a schematic structural diagram illustrating a server according to an exemplary embodiment of the present disclosure.

Referring to FIG. 8, a schematic structural diagram of a server involved in the embodiments of the present disclosure is illustrated. The server may be configured to perform the temperature prompting methods provided in the above embodiments. To be specific:

The server 800 may function differently depending on configuration or performance, and may include at least one central processing unit (CPU) 822 (for example, at least one processor), a memory 832, at least one storage medium 830 (for example, at least one mass storage device) for storing an application 842 or data 844. The memory 832 and the storage medium 830 may be used for transitory storage or non-transitory storage. Programs stored in the storage medium 830 may include at least one module (not illustrated in the drawings), where each module may include a series of operation instructions to be executed on the server. Further, the CPU 822 may be set as communicating with the storage medium 830, and executing a series of operation instructions included in the storage medium 830 on the server 800. The server 800 may further include at least one power supply 826, at least one wired or wireless network interface 850, at least one input/output interface 858, at least one keyboard 856, and/or at least one operating system 841, for example, Windows Server™, Mac OS X™, Unix™, Linux™, FreeBSD™, and the like. Specifically, in this embodiment, the server includes a memory and at least one program, wherein the at least one program is stored in the memory and may include at least one module. Each module may include a series of operation instructions to be executed on the server, and is configured to be executed by at least one processor. The at least one program includes instructions for performing the following operations: acquiring a current temperature in a target container, and acquiring a distance of the target container to a target terminal, which is linked to the target container; determining, according to the current temperature, a first time duration to be elapsed when the temperature in the target container changes to a predetermined target temperature; determining, according to the distance of the target container to the target terminal, a second time duration to be elapsed when the target terminal moves to a location where the target container stands; and triggering a prompt signal if the first time duration is less than or equal to the second time duration.

Optionally, acquiring the current temperature in the target container, and acquiring the distance of the target container to the target terminal, which is linked to the target container includes: acquiring the current temperature in the target container, and acquiring the distance of the target container to the target terminal, which is linked to the target container if a difference between the current temperature and the predetermined target temperature is less than a predetermined threshold.

Optionally, determining, according to the current temperature, the first time duration to be elapsed when the temperature in the target container changes to the predetermined target temperature includes: determining, according to the current temperature and the prestored function of temperature with respect to time, the first time duration to be elapsed when the temperature in the target container changes to the predetermined target temperature.

Optionally, determining, according to the distance of the target container to the target terminal, the second time duration to be elapsed when the target terminal moves to a location where the target container stands includes: acquiring a movement speed of the target terminal according to historic movements; and determining, according to the distance of the target container to the target terminal and the movement speed, the second time duration to be elapsed when the target terminal moves to a location where the target container stands.

Optionally, triggering the prompt signal if the first time duration is less than or equal to the second time duration includes: if the first time duration is less than or equal to the second time duration, sending a prompt notification to the target terminal, such that the target terminal emits the prompt signal; and/or if the first time duration is less than or equal to the second time duration, sending a prompt notification to the target container, such that the target container emits the prompt signal.

In the embodiments of the present disclosure, a current temperature in a target container is acquired, and a distance of the target container to a target terminal, which is linked to the target container is acquired; a first time duration to be elapsed when the temperature in the target container changes to a predetermined target temperature is determined according to the current temperature; a second time duration to be elapsed when the target terminal moves to a location where the target container stands is determined according to the distance of the target container to the target terminal; and a prompt signal is triggered if the first time duration is less than or equal to the second time duration. In this way, any predetermined target temperature may be prompted, such that the temperature in the container may be controlled at any target temperature, thereby improving flexibility in temperature control.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A temperature prompting device, comprising:
   one or more processors;
   a memory; and
   one or more modules stored in the memory and being configured to be executed by the one or more processors, the one or more modules having the following functions:
   acquiring a current temperature in a target container;
   acquiring a distance of the target container to a target terminal, which is linked to the target container;
   determining, according to the current temperature, a first time duration to be elapsed when a temperature in the target container changes to a predetermined target temperature;
   determining, according to the distance of the target container to the target terminal, a second time duration to be elapsed when the target terminal moves to a location where the target container stands; and
   triggering a prompt signal if the first time duration is less than or equal to the second time duration.

2. The device according to claim 1, wherein the distance of the target container to the target terminal is acquired, if a difference between the current temperature and the predetermined target temperature is less than a predetermined threshold.

3. The device according to claim 1, wherein the first time duration is determined according to not only the current temperature but also a prestored function of temperature with respect to time.

4. The device according to claim 1, wherein the second time duration is determined according to not only the distance of the target container to the target terminal but also a movement speed of the target terminal.

5. The device according to claim 4, wherein the movement speed of the target terminal is determined according to historic movements of the target terminal.

6. The device according to claim 1, wherein triggering the prompt signal comprises:
   sending a prompt notification to the target terminal, such that the target terminal emits the prompt signal.

7. The device according to claim 1, wherein triggering the prompt signal comprises:
   sending a prompt notification to the target container, such that the target container emits the prompt signal.

8. A non-transitory computer-readable storage medium having stored therein instructions that, when executed by one or more processors of a device, cause the device to perform:
   acquiring a current temperature in a target container;
   acquiring a distance of the target container to a target terminal, which is linked to the target container;
   determining, according to the current temperature, a first time duration to be elapsed when a temperature in the target container changes to a predetermined target temperature;
   determining, according to the distance of the target container to the target terminal, a second time duration to be elapsed when the target terminal moves to a location where the target container stands; and
   triggering a prompt signal if the first time duration is less than or equal to the second time duration.

* * * * *